United States Patent
Yamazaki et al.

[11] Patent Number: 6,118,972
[45] Date of Patent: Sep. 12, 2000

[54] IMAGE FORMING APPARATUS AND IMAGE FORMING METHOD

[75] Inventors: Hirohiko Yamazaki; Takeo Morohashi; Akitoshi Matsubara, all of Hachioji, Japan

[73] Assignee: Konica Corporation, Tokyo, Japan

[21] Appl. No.: 09/393,742

[22] Filed: Sep. 10, 1999

[30] Foreign Application Priority Data

Sep. 14, 1998 [JP] Japan .................................. 10-259523

[51] Int. Cl.$^7$ .......................... G03G 15/00; G03G 21/00
[52] U.S. Cl. ................. 399/370; 399/38; 399/82
[58] Field of Search ................. 399/16, 38, 81, 399/82, 85, 86, 363, 370, 376, 388, 389; 271/3.15, 9.01, 9.06; 358/474, 488

[56] References Cited

U.S. PATENT DOCUMENTS

| | | | |
|---|---|---|---|
| 5,734,958 | 3/1998 | Kazama et al. | 399/363 |
| 5,946,527 | 8/1999 | Salgado e al. | 399/82 |
| 5,995,801 | 11/1999 | Katsuta et al. | 358/474 X |

*Primary Examiner*—Sophia S. Chen
*Attorney, Agent, or Firm*—Frishauf, Holtz, Goodman, Langer & Chick, P.C.

[57] ABSTRACT

An image forming apparatus includes: a tray on which documents are stacked; a first document size detector for detecting a size of the documents stacked on the tray; a second document size detector for detecting a size of each of the documents conveyed from the tray; an automatic document feeding device having a document reading section for reading an image of each of the documents; an image forming section including a transfer material feeder for feeding transfer materials; and a controller for selecting and feeding transfer materials according to the detected document size. When the first document size detector detects that the size of the documents is identical to a regular size, the controller selects and feeds the transfer materials in accordance with the regular size, and when the first document size detector detects that the size of the documents is not identical to the regular size, the controller controls the second document size detector to detect the size of each of the documents conveyed from the tray, and selects and feeds transfer materials in accordance with the size detected by the second document size detector.

5 Claims, 6 Drawing Sheets

IMAGE FORMING APPARATUS AND IMAGE FORMING METHOD

BACKGROUND OF THE INVENTION

The present invention relates to an image forming apparatus such as a copier, printer, facsimile device, or the like, to which an electrophotographic method is applied, and its control method, and particularly, to a digital type image forming apparatus which forms an image by automatically detecting a size of the document and automatically selecting a transfer material corresponding to the size of the document, and its control method.

Recently, a digital type image forming apparatus which reads a document image and forms an image based on the read image data, is used. In this type image forming apparatus, the document image is read by a CCD image sensor, or the like, and the read-out image data is stored once in a memory. Image data stored in the memory is outputted after image processing such as reduction, enlargement, and rotation of the image is conducted corresponding to requests of the user, a latent image is formed on a photoreceptor, next, developed by developer and a toner image is formed, the toner image is transferred onto a predetermined transfer material, and the image is formed.

Further, at the start of image forming operations, a memory area appropriate for the document size is previously set, and after that, the image forming operations including image reading, sheet feeding of the transfer material, or similar operations, are started.

In contrast to that, in order to increase the productivity in the image formation, it is effective that transfer material having the size appropriate for the document size is selected from the document size information during image reading, sheet feeding of the transfer material is previously started, and it is on standby at the position of registration rollers in a sheet feed section. Accordingly, in order to increase the productivity in the digital type image forming apparatus, it is the presupposition that the document size or transfer material size is previously detected or set. However, the size of the transfer material can also be automatically selected from the document size information, and therefore, the detection of the document size is an important factor.

On the other hand, in the image forming apparatus, an automatic document feeding apparatus is provided to eliminate troublesomeness in which the operator sets the document on a platen for each sheet, thereby, the operator can easily copy a plurality of documents by only setting them on a placement tray. Further, document modes corresponding to each type of document are provided, for example, the same series document mode in which image formation is conducted by using only the same sized and regular sized document, and the different series mixture document mode in which irregular sized documents or different sized documents are mixed, and image formation is conducted by using them, are applied.

In the image forming apparatus provided with such an automatic document feeding apparatus, the document size is automatically detected and the corresponding transfer material is automatically selected, and the image formation is conducted.

As for the above-described document size detection method, many methods are commonly known, and as the first method, there is a method which is widely used in the conventional analog type copier, and in which the document is conveyed onto a platen on which the document is placed and the image is exposed, and the document size is detected by using an exposure light source on the platen. In this first method, because the document size is detected after the document is conveyed from the automatic document feeding apparatus onto the platen, the time period for conveying the document onto the platen is necessary, and so much time period is passed to start the image formation, thereby, the copy productivity is lowered, which is a problem.

The second method is a method in which the lateral width of the document is detected by the position of the lateral width regulation plate on the document placement tray, and the document is fed and the leading edge and trailing edge are detected, thereby, the length (longitude) in the conveyance direction is detected, and thereby, the document size is detected. In this second method, because a sensor to detect the document size is provided on the conveyance path, the document size can not be detected if the detection is not conducted after the document is fed and the overall length (longitude) of the document is sent. Therefore, this method is slightly improved as compared to the first method, however, it is not an essential improvement, and in the same manner as in the first method, the document conveyance time is necessary, and the time period necessary to the start of the image formation is long, thereby, the copy productivity is lowered, which is a problem.

As the third method to solve the first and second problems, the present inventors have proposed a method previously in which the longitudinal and lateral document sizes are detected on the document placement tray, thereby, the image formation can be immediately started, a nd copy can be conducted with high productivity, and have intended to solve the defects of the first and second method, and to increase the copy productivity.

However, in further consideration from the view point of reliability by the present inventors, it has been found that the document size detection has a new problem. That is, when the operator places the a plurality of document sheets on the document placement tray, it is not necessarily follow that overall document sheets are accurately aligned and correctly placed. Accordingly, when the document sheets are irregularly placed, the irregular document sheet is detected by a sensor which detects the larger document sheet, and the length of longitudinal or lateral side is detected to be larger than the size of the original one, thereby, the document sheet can not be detected as the regular size. For example, in the document size detection, when the document size is detected by arranging the document detection sensors corresponding to each regular size, when A4R sized document is placed, even if the lateral width can be detected to be the regular width of the A4R sized sheet, if the longitudinal length is detected to be the length of the B4 sized sheet which is longer than that of the A4R sized sheet, this document sheet size is detected to be A4R sized width and B4 sized length, and can not be detected as a predetermined A4R regular sized sheet.

In this case, when the same series document mode is set, the transfer material of the corresponding size can not be selected from the regular sized transfer material, resulting in stoppage of image forming operations. Further, in the same manner as described above, also when the same series document mode is set to irregular sized documents, the image forming operation can not be started, resulting in stoppage of image forming operations.

On the other hand, in the productivity of the image formation, when the size of document sheets are the same, if the first document size information is obtained, the second and subsequent document sizes are not detected and regarded as the same size, and the document size detection process and the automatic transfer material selection process are neglected, and the sheet feeding operation can be started earlier, thereby, the image formation productivity can be increased. However, when the different series document mode which is applied for different type document sizes, is conducted, it is necessary that the image formation is carried out by detecting the document size for each document sheet even if the document sheets are the same size, and transfer sheet feeding can not be carried out earlier, thereby, such a problem occurs that the image formation productivity is lowered.

SUMMARY OF THE INVENTION

Accordingly, an object of the present invention is to solve the above-described problems, and to provide an image forming apparatus and its control method in which, even if the first document size detection means can not detect that the document size is the regular size, because the document sheets are irregularly placed on the document placement tray, the image formation can be performed without being stopped. Further, another object of the present invention is to provide an image forming apparatus and its control method in which, in the case where it can not be detected that the document sheets are the regular size, because the document sheets are irregularly placed even if the same sized document sheets are placed, the document size is detected and the image formation can be performed without being stopped. Further, still another object of the present invention is to provide an image forming apparatus and its control method in which, when the regular same sized document sheets are placed, even when the document sheets are irregularly placed, copy can be performed with high productivity in the same manner as in the case of regular placement.

In order to solve the above-described problems and to attain the object, the present invention is structured as follows.

The first structure of the present invention is an image forming apparatus which has an automatic document sheet feeding apparatus including: a document placement tray; the first document size detection means for detecting the size of the document under the condition that the document is placed on the document placement tray; the second document size detection means for detecting the size of the document fed from the document placement tray; and a document reading section to read the document image, and has an image forming section having a transfer material feeding means, wherein a control means for controlling the apparatus such that: when the document size information detected by the first document size detection means is a regular size, selection and sheet feeding of the transfer material of the corresponding size are conducted; and when the document size information detected by the first document size detection means is not a regular size, the document size is detected by the second document size detection means, and selection and sheet feeding of the transfer material of the corresponding size are conducted, is provided in the image forming apparatus.

According to an image forming apparatus of the first structure of the present invention, even when the document can not be detected to be regular size by the first document size detection means provided on the document placement tray because, for example, the regular sized and the same sized document sheets are irregularly placed, the document size is detected again by the second document size detection means and detected to be regular size, thereby, the image formation is not stopped by the false detection of the document size, and even if the document is irregularly placed, the image formation with high productivity can be performed.

The second structure of the present invention is a control method of an image forming apparatus which has an automatic document sheet feeding apparatus including: a document placement tray; the first document size detection means for detecting the size of the document under the condition that the document is placed on the document placement tray; the second document size detection means for detecting the size of the document fed from the document placement tray; and a document reading section to read the document image, and has an image forming section having a transfer material feeding means, and a control means for controlling the selection and feeding of the corresponding transfer material based on the document size information, wherein the control means controls the apparatus such that: when the document size information detected by the first document size detection means is a regular size, selection and sheet feeding of the transfer material of the corresponding size are conducted; and when the document size information detected by the first document size detection means is not a regular size, the document size is detected by the second document size detection means, and selection and feeding of the transfer material of the corresponding size are conducted.

According to a control method of an image forming apparatus of the second structure of the present invention, even when the document can not be detected to be the regular size by the first document size detection means provided on the document placement tray because, for example, the regular sized and the same sized document sheets are irregularly placed, the document size is detected again by the second document size detection means and detected to be the regular size, thereby, the image formation is not stopped by the false detection of the document size, and even if the document is irregularly placed, the image formation with high productivity can be performed.

The third structure of the present invention is a control method of an image forming apparatus which has an automatic document sheet feeding apparatus including: a document placement tray; the first document size detection means for detecting the size of the document under the condition that the document is placed on the document placement tray; the second document size detection means for detecting the size of the document fed from the document placement tray; and a document reading section to read the document image, and has an image forming section having a transfer material feeding means, and a control means for controlling the selection and feeding of the corresponding transfer material based on the document size information, wherein a document selection means for selecting the same series document mode and a different series document mode, is provided in an operation section, and the control means controls that: when the same series document mode is selected, selection and feeding of the transfer material are conducted based on the document size information detected by the first document size detection means; when the different series document mode is selected, the document size is detected by the second document size detection means for each document sheet, and selection and feeding of the transfer material of the corresponding size is conducted; and when the document size detected by the first document size detection means is not the regular size, the document mode is switched to the different series document mode, and the document size is detected by the second document size detection means, and the image formation is performed.

According to the control method of the image forming apparatus of the third structure of the present invention, although the same series document mode is selected, even when the regular sized document can not be detected by the first document size detection means provided on the document placement tray because, for example, the regular sized and the same sized document sheets are irregularly placed, the document mode is automatically selected to the different series document mode, and the document size can be detected by the second document size detection means, thereby, the image formation is not stopped by the false detection of the document size, and when the same series document mode is selected, even if the document sheets are irregularly placed, the image formation can be performed.

The fourth structure of the present invention is a control method of an image forming apparatus which has an automatic document sheet feeding apparatus including: a document placement tray; the first document size detection means for detecting the size of the document under the condition that the document is placed on the document placement tray; the second document size detection means for detecting the size of the document fed from the document placement tray; and a document reading section to read the document image, and has an image forming section having a transfer material feeding means, and a control means for controlling the s election and feeding of the corresponding transfer material based on the document size information, wherein the control means controls that: when the document size detected by the first document size detection means is the regular size, selection and feeding of the transfer material corresponding to the regular size are conducted; when the document size detect ed by the first document size detection means is not the regular size, the size of the first document sheet is detected by the second document size detection means, and when the document size of the first sheet is the regular size, the size of the second and subsequent document sheets is not detected; and the transfer material selected by the document size information of the first document sheet is fed.

According to the control method of the image forming apparatus of the fourth structure of the present invention, even when the document can not be detected as the regular sized document by the fist document size detection means provided on the document placement tray, the false detection of the document size is eliminated by detecting the document size again by the second document size detection means and the image formation can be performed, and when the same series document mode is selected, the detection of the second and subsequent documents is neglected, thereby, copy can be performed with high productivity.

DETAILED DESCRIPTION OF THE PREFERRED EMBODIMENT

Referring to drawings, embodiments of an image forming apparatus and its control method of the present invention will be described below, however, the present invention is not limited to these embodiments.

Figure 1:
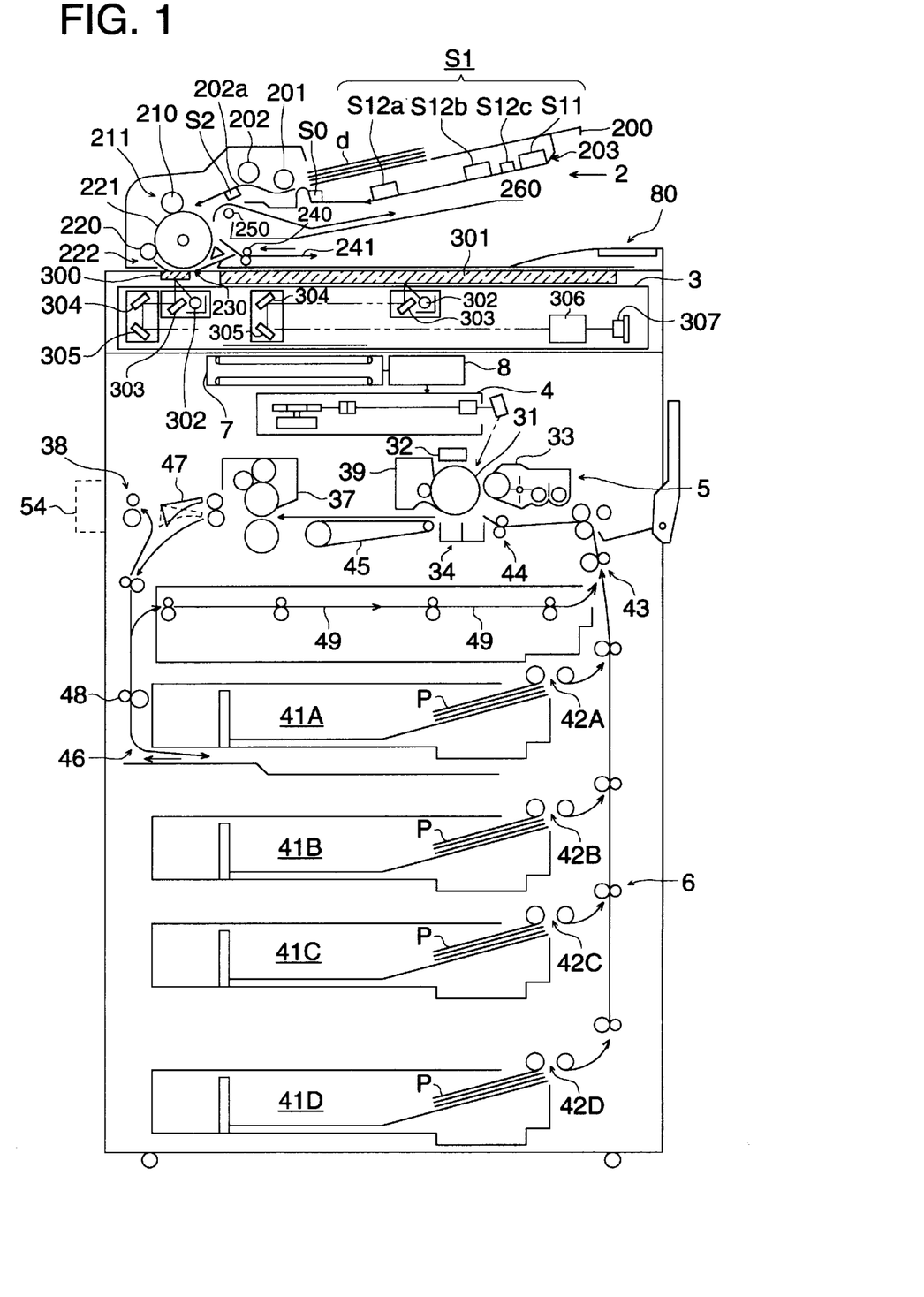
FIG. 1 is a structural sectional view of an image forming apparatus.
Figure 2A:
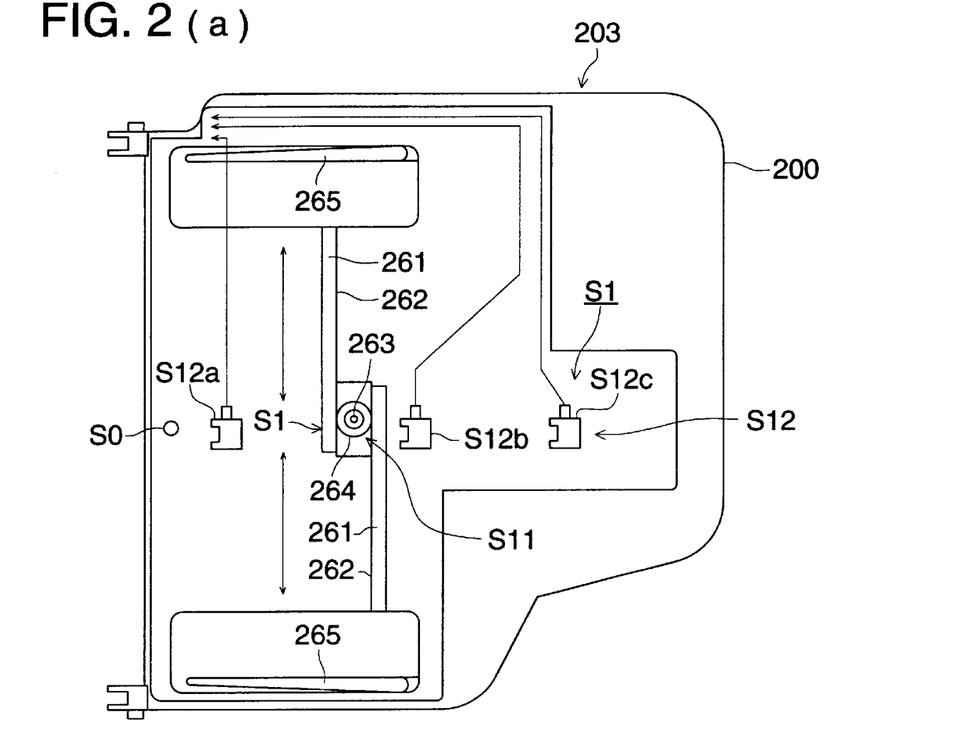
FIGS. 2(a) and 2(b) are views showing a condition of sensor arrangement and a condition of document arrangement in a document feeding section.
Figure 2B:
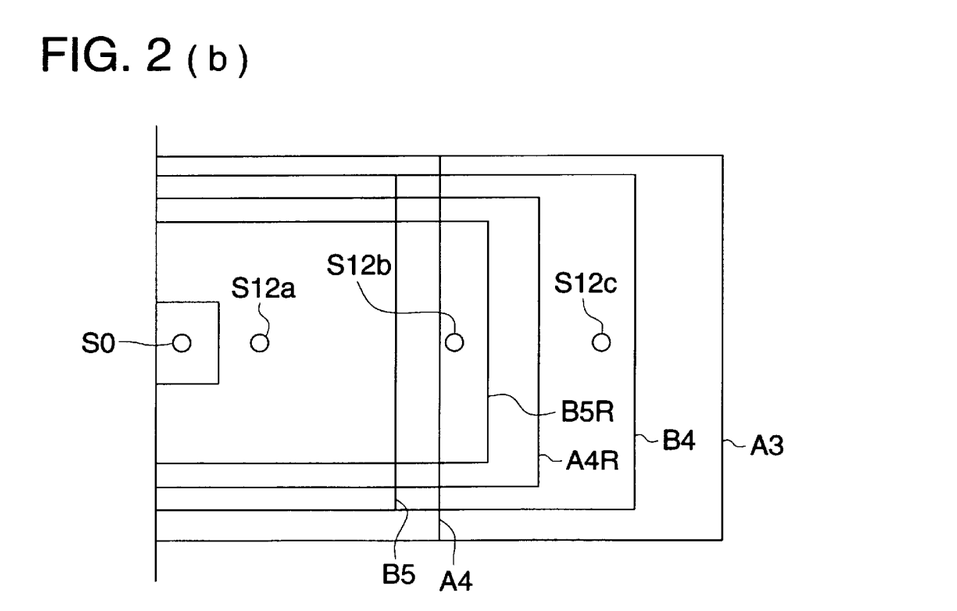
Figure 3:
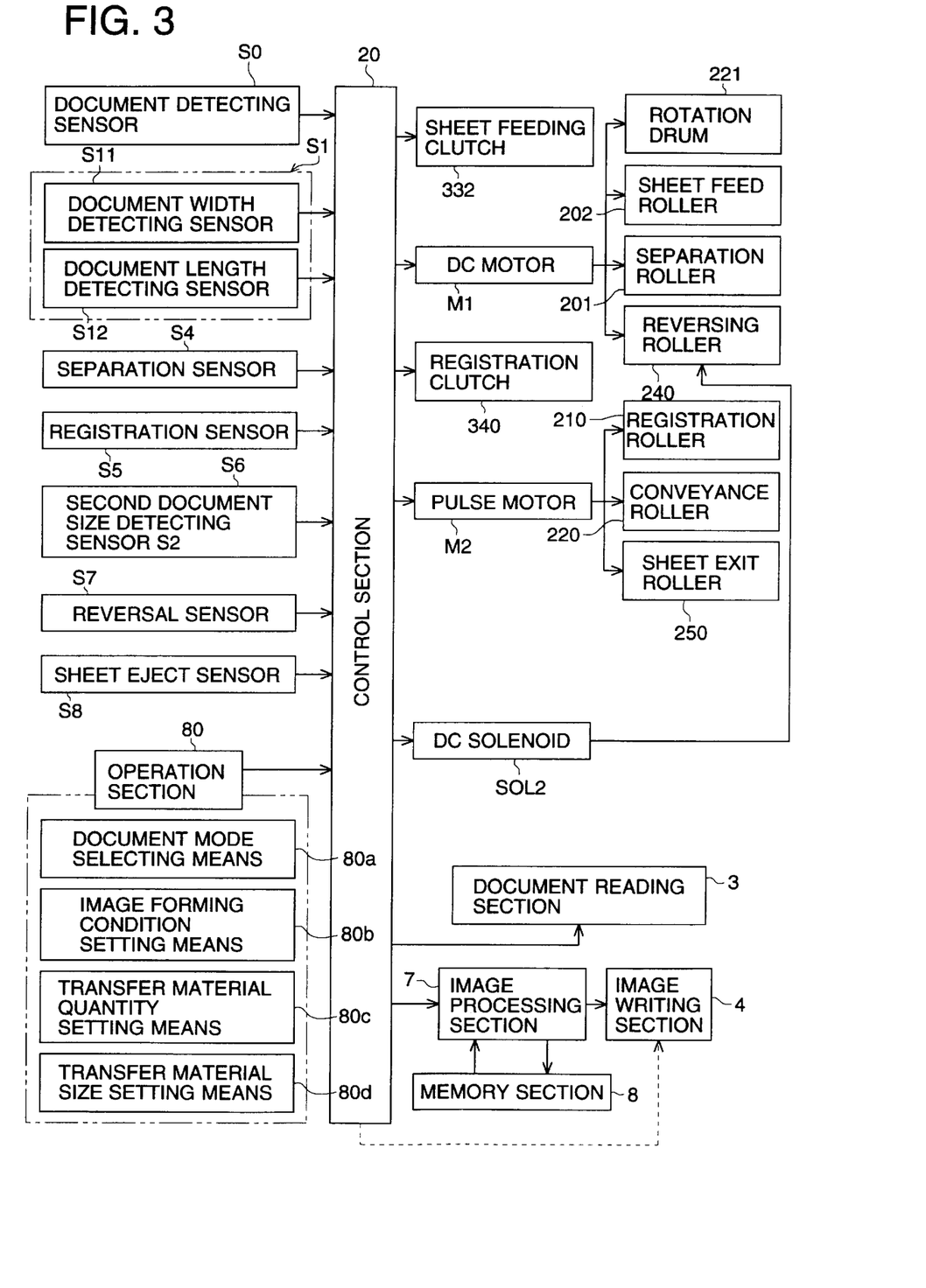
FIG. 3 is a block diagram showing a structure of the image forming apparatus.

FIG. 1 is a structural sectional view of an image forming apparatus according to the present invention. FIGS. 2(a) and 2(b) are views showing a condition of sensor arrangement and a condition of document arrangement in a document feeding section. FIG. 3 is a block diagram showing a structure of the image forming apparatus. This image forming apparatus 1 comprises: an operation section 80; an automatic document feeding apparatus (ADF) 2; a document reading section 3; an image processing section 7; an image writing section 4; an image forming section 5 having a transfer material feeding means; and a sheet feeding section 6.

In the operation section 80, switches, numeral keys, and a liquid crystal touch panel are arranged, and required image forming conditions such as the number of sheets, variable magnification, copy density, two-sided copy, transfer material size selection, and start, can be inputted.

The automatic document feeding apparatus 2 has: a document feeding section having a document placement tray 200, a sheet feed roller 201, and a separation roller 202; a registration section 211 having a registration sensor S5 by which curvature of the document "d" fed from the document feeding section is corrected and the document "d" is in timed relationship with the system, and a registration roller 210; a conveyance section 222 having a conveyance roller 220 to convey the document to a document reading position 230, and a rotation roller 221; a document reading position 230; a document reversal section 241 having a reversal roller 240; a delivery sheet roller 250; and a delivery sheet tray 260, and the document "d" placed on the document placement tray 200 of the document feeding section 203 is successively conveyed to the document reading position 230 and the document "d" is read out, and delivered onto the delivery sheet tray 260.

Further, when two-side reading is conducted, after the reading of the first side (obverse side), the document is reversed by the reversal section 241 and conveyed again to the document reading position 230, and the second side (reverse side) is read out, and the document is delivered onto the delivery sheet tray 260.

On the document placement tray 200 of the document feeding section 203, as shown in FIG. 2(a), a document detection sensor S0 structured by an empty sensor to detect the existence of the document, and the first document size detection sensor S1 which is the first document size detection means to detect the document size under the condition that the document is placed, are provided. The first document size detection sensor S1 is structured by a document width detection sensor S11 to detect the width of the document in the direction perpendicular to the conveyance direction, and the document length detection sensor S12 to detect the length of the document in the conveyance direction.

The document width detection sensor S11 is structured as follows: regulation plates 265 to regulate and align the document are provided on both sides of the document placement tray 200 movably in the direction perpendicular to the document conveyance direction, and a plate 261 is provided to the regulation plate 265, and a rack 262 is formed on the side opposite to the plate 261, and the rack 262 is engaged with a pinion 264 of a rotation shaft 263. When the regulation plates 265 are moved in the document width direction corresponding to the width of the document "d", the rotation shaft 263 is rotated through the plate 261, and an amount of this rotation is detected by the document width detection sensor S11. The document width detection sensor S11 is structured by, for example, a rotary volume. The document length detection sensor S12 provided on the document placement tray 200, is structured by a plurality of document length detection sensors S12a–S12c arranged in predetermined positions in the sheet feeding direction.

In the present example, 3 document length detection sensors S12a–S12c are arranged. The document length detection sensors S12a–S12c are structured by, for example, limit switches or photo-sensors. In the present embodiment, the fist document size detection sensor S1 is structured by the document width detection sensor S11 and the document length detection sensors S12a–S12c, and the document size is detected from the document width information and the document length information, and is used for the control information of the image forming apparatus. Referring to FIG. 2(b), the detection method of the document size by the first document size detection sensor S1 will be concretely described below.

As shown in FIG. 2(b), when only document length detection sensor S12a is on, the document size is judged to be size B5 or size A4 according to the document width information of the document width detection sensor S11. Further, when document length detection sensors S12a and S12b are on, the document size is judged to be size B5R or size A4R according to the document width information of the document width detection sensor S11. Further, when document length detection sensors S12a, S12b and S12c are on, the document size is judged to be size B4 or size A3 according to the document width information of the document width detection sensor S11.

As described above, the first document size detection sensor S1 is structured by the detection width detection sensor S11 and the document length detection sensors S12a–S12c, and the document size placed on the document placement tray 200 is easily and surely detected under the condition that the document is placed on the tray. On the downstream side of the document placement tray 200, the sheet feed roller 201 and the separation roller 202 are arranged in order. The sheet feed roller 201 is ordinarily on stand-by condition, and moved from the stand-by position to the sheet feeding position by the operation of the sheet feeding clutch, and is rotated at a predetermined timing and the document "d" is fed. The separation roller 202 is arranged opposite to a separation pad 202a, and only one document sheet is separated and fed so that a plurality of document sheets are not fed.

On the downstream side of the document feeding section 203, a drum-like rotation roller 221, a conveyance roller 220 are arranged, and the conveyance roller 220 and registration roller 210 are arranged around the drum-like rotation roller 221, and by these drive, the document "d" is conveyed to the reading position 230. On the downstream side in the vicinity of the registration roller 210, the document detection sensor S6 is provided, and which is also used as the document reading sensor and the second document size detection sensor S2, serving as the second document size detection means to detect the document size. When the leading edge of the document "d" is detected by the document reading sensor structured by the document detection sensor S6, a document reading trigger signal is outputted. When the leading edge of the document "d" is detected by the document reading sensor, and the document "d" reaches the registration roller 210 after a predetermined time period, the document "d" is stopped once and on the stand-by condition. When a reading start signal is sent from the control section, conveyance of the document "d" is re-started, and when the document "d" passes the reading position 230, the document image is read by the reading means.

Further, the second document size detection sensor S2 structured by the document detection sensor S6 detects the leading edge and trailing edge of the document "d", thereby, detects the length of the document corresponding to the conveyance direction of the document "d". Further, when sensors are respectively arranged on the positions corresponding to the width of the regular size document, the width of the document can be detected. Further, when a line sensor is used for the second document size detection sensor S2 structured by the document detection sensor S6, it is preferable because the width and length of the document can be detected.

When the document size is detected by the second document size detection sensor S2, the document is sent once until the trailing edge of the document passes through the second document size detection sensor S2, and after that, the document is switched back until its leading edge is detected by the document detection sensor S6, and sent again to the position of the registration roller 210, and is on standby. When the reading start signal is received, the document is sent again from the registration roller 210, and is read. The document for which reading is completed, is delivered onto the delivery sheet tray 260. In the case of two-sided document, the document is reversed by switch-back by the reversal roller 240 of the document reversal section 241, conveyed again to the document reading position 230, and after the reverse side of the document has been read, the document is delivered onto the delivery sheet tray 260.

The document reading section 3 is composed of a platen glass 300 in which exposure for reading is conducted while the document is being moved thereon, a platen glass 301 in which exposure for reading is conducted under the condition that the document is placed thereon, a light source 302, mirrors 303, 304, 305, an image forming optical system 306, an image sensor composed of a CCD, and an optical drive system. In the document reading section 3, light rays are irradiated on the document "d" on the platen glass 300, 301 from the light source 302 composed of a xenon lamp, and the reflected light is guided to mirrors 303, 304 and 305, and entered into the CCD image sensor 307 through the image forming optical system 306.

According to this, an image of the document "d" is formed on the light receiving surface of the CCD image sensor 307. Herein, in the case where the document is placed on the platen glass 301, the optical driving system scans the document along the platen glass 301, and the image is read in by the CCD image sensor 307. Further, in the case where the document is automatically fed by the automatic document feeding apparatus, under the condition that the light source 302 and mirrors 303, 304 and 305 are fixed under the platen glass 300, the image is read in by the CCD image sensor 307 while the document is being conveyed. The image data read out by the document reading section 3 is stored in a memory section 8 after a predetermined image processing is conducted in the image processing section 7.

In the sheet feed section 6, sheet feed trays 41A–41D are provided, and each size transfer material P is accommodated in each of sheet feed trays 41a–41D. The transfer material which is automatically selected by the information from the first or second document size detection sensor S1 or S2, is conveyed from any one of sheet feed trays 41A–41D, and fed to the image forming section 5.

When the image signal is inputted into the image writing section 4, the image forming section 5 starts an image recording operation. That is, a photoreceptor drum 31 is rotated clockwise as shown by an arrow, and after being discharged, because the photoreceptor drum 31 is electrically charged by a charger 32, an electrostatic latent image corresponding to an image of the document "d" is formed on the photoreceptor drum 31 by laser beams by the image writing section 4. After that, the electrostatic latent image on the photoreceptor drum 31 is reversal-developed by the developer of developing units 33, and a visual toner image is formed.

On the other hand, from the sheet feed cassettes 41A–41D, the transfer material P of the size, which is automatically selected by the information from the first or second document size detection sensor S1 or S2, is conveyed one by one sheet by conveyance rollers 42A–42D, and fed toward a transfer section 34 of the image through a conveyance roller 43. Thus fed transfer material P is sent out onto the photoreceptor drum 31 by a registration roller 44 which is operated in timed relationship with the toner image on the photoreceptor drum 31. The toner image on the photoreceptor drum 31 is transferred onto the transfer material P by the action of a transfer unit 34, and after the transfer sheet P is separated from the photoreceptor drum 31, the transfer sheet P is sent to a fixing device 37 through a conveyance belt 45, and after the toner image is fused and fixed, the transfer sheet P is delivered onto a tray 54 provided outside the apparatus by a delivery sheet roller 38.

The photoreceptor drum 31 is further rotated, and toner remaining on its surface without being transferred, is removed and cleaned by a cleaning device 39. After the surface of the photoreceptor drum 31 is discharged again, it is uniformly charged by the charger 32, and enters into the next image formation process.

The sheet feeding section 6 is provided with a reversal section 46, and the fixed transfer material P is conveyed downward through a guide 47 and enters into the reversal section 46. Next, the transfer material P existing in the reversal section 46 is sent out again by the reversal roller 48, and sent again to the image forming section 5 through a reversal conveyance path 49, and the next image formation is conducted.

Next, control of the present invention will be described. FIG. 3 is a schematic block diagram of the control. On the touch panel display of the operation section 80, a document mode selection means 80a for selecting the document mode corresponding to kinds of the document, is arranged. In the document mode, the same series document mode and the different series document mode are selectable, and on the normal condition just after the power source is turned on, the same series document mode is set. The operator can set the document mode by the selection from the touch panel. That is, the document mode has the same series document mode for only the same sized document and the different series mixed document mode for the document in which a plurality of different sized documents are mixed.

At the start of image forming operations, the document mode is judged, and the image formation is carried out by the document mode selected in the operation section 80. When the same series document mode is selected, the document size is detected by the first document size detection sensor S1 provided on the document placement tray 200 of the automatic document feeding apparatus 2, and according to the document size information, keeping of the memory area, and selection of the transfer material and sheet feeding tray corresponding to the document size are carried out. When the same series mode is set, because the size of all document sheets is the same, the document size detection for the second and subsequent document sheet is not conducted, and the size is regarded as the same as that of the first document sheet, and the automatic selection and keeping of the memory are conducted in the same manner as the first document sheet, and the image formation is continuously conducted (high productivity mode). In this manner, because the document size detection of the second and subsequent document sheet is omitted and the image formation is continuously conducted, the image formation time period can be shortened, and high productivity can be obtained, which is preferable.

On the other hand, in the different series mixed document mode, because an object is different sized document sheets, a size of a plurality of document sheets is detected one by one sheet, and according to this detection information, the transfer material is automatically selected for each document sheet. Accordingly, because the first document size detection sensor S1, which detects the size of the document on the placement condition, can not detect the document size for each document sheet, the second document size detection sensor S2, which detects the document size for each document sheet, detects the document size. This second document size detection sensor S2 is provided on the conveyance path of the automatic document feeding apparatus 2, and the document size is detected while the document is fed and conveyed for each sheet. The document "d" placed on the document placement tray 200 of the automatic document feeding apparatus 2 is automatically fed successively one by one sheet from the uppermost document sheet, and after the image is read by the reading section, the document sheet is delivered onto the delivery sheet tray 260 with its obverse side facing downward. The detection information from the document detection sensor S0, document width detection sensor S11 and 3 document length detection sensor S12 (S12a–S12c) constituting the first document size detection sensor S1, separation sensor S4, registration sensor S5, document detection sensor S6 (the second document size detection sensor S2), reversal sensor S7, and delivery sensor S8; and the setting information from the document mode selection means 80a, image density, and image forming condition setting means 80b and number of transfer material setting means 80c, and transfer size selection means 80d, of the operation section 80, are inputted into the control section 20 constituting the control means. The document mode selection means 80a is structured by a button to set the same series or different series document modes, and on the initial condition just after the power source is turned on, the same series document mode is automatically set, and two modes are switched such that, each time when the button is pressed, either one of the two modes can be selected.

The control section 20 controls a sheet feed clutch 332, registration clutch 340, DC motor M1 and pulse motor M2, DC solenoid SOL2 and transfer material selection means, which will be described later, based on these sensor information and setting information. The Dc motor M1 drives the rotation roller 221, sheet feed roller 201 and separation roller 202, and also drives the reversal roller 240. The pulse motor M2 drives the registration roller 210, conveyance roller 220 and delivery sheet roller 250. Further, the DC solenoid SOL2 releases the pressure contact of the reversal roller 240 for a predetermined time.

Next, Referring to the first flow chart in FIG. 4, copying steps by the automatic document size detection in the image forming apparatus having thus structured automatic document feeding apparatus 2, will be described. Initially, the operator sets the document mode, image forming conditions, the number of copy sheets, or the like, in the operation section. Next, when the document is placed on the document placement tray 200, existence of the document is detected by the document detection sensor S0 structured by an empty sensor, the document size is detected by the first document size detection sensor S1, and the document size information is recorded in a predetermined memory area. When the copy start button is pressed, a series of copying operations are started.

Figure 4:
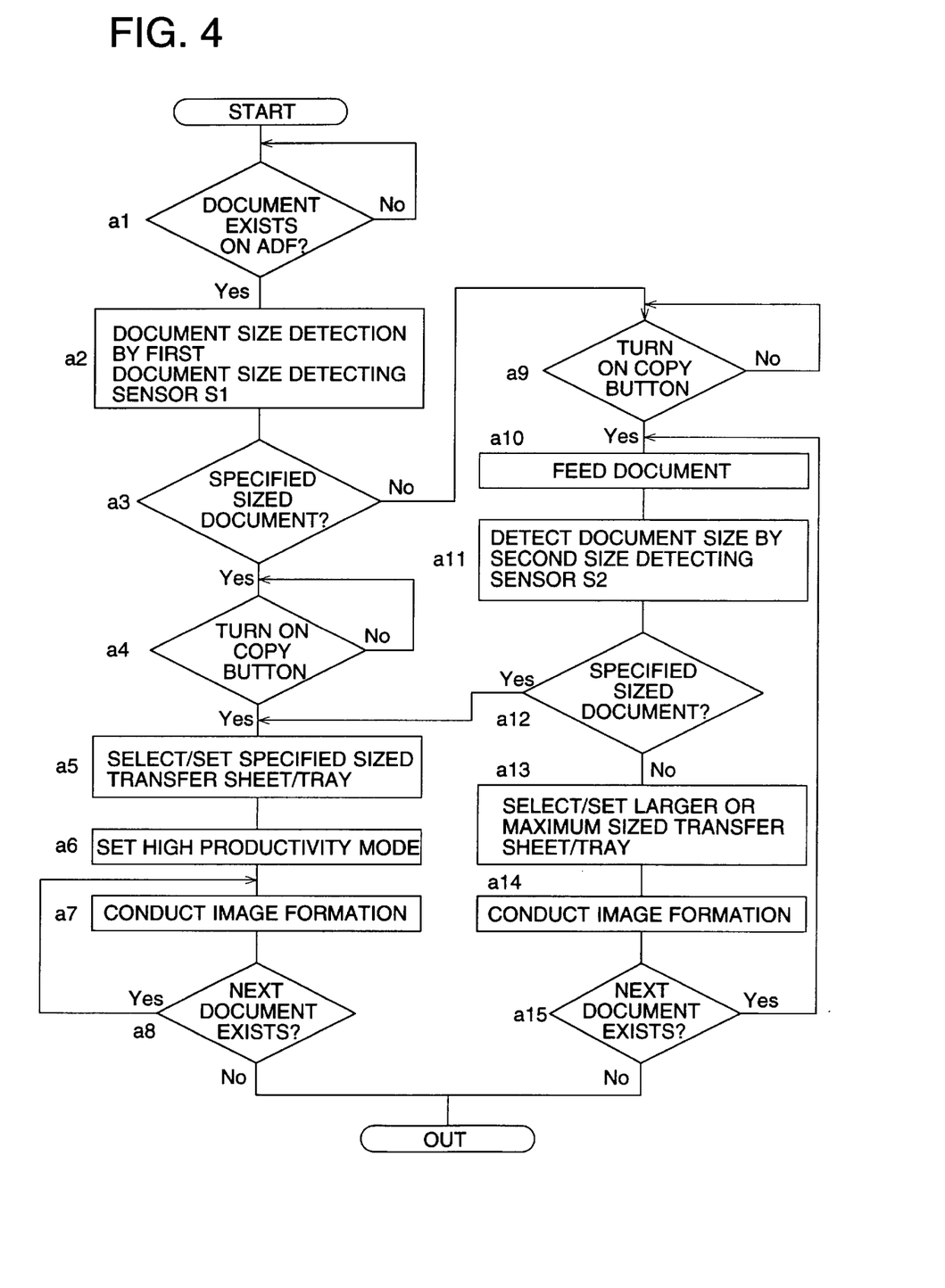
FIG. 4 is a first flow chart showing copying steps by automatic document size detection.

In FIG. 4, initially in step a1, when the document is placed on the document placement tray 200, existence of the document is detected by the document detection sensor S0, and the sequence advances to step a2 and the document size is detected by the first document size detection sensor S1, and it is judged in step a3 whether the document size is the regular size or not. When it is judged that the document size is the regular size, the sequence advances to step a5 when the copy button is pressed on in step a4, and the transfer material corresponding to the document size and the sheet feed tray accommodating the transfer material are selected and set.

In the case where the regular sized document is placed and copying is conducted, if the document is judged to be the regular sized one, because the size of the second and subsequent document sheet is the same size as the first document sheet, the size of the second and subsequent document sheet is not detected, and it is preferable that the high productivity mode is performed, in which, by using the same sized transfer material as the transfer material selected by the document size information of the first sheet, the following copy operation is conducted, and therefore, the high productivity mode is set in step a6.

Next, in step a7, the image formation is conducted, and it is judged in step a8 whether the next document exists or not, and when the next document exists, the image formation is repeated, and when it is detected that there is no document on the tray, the operation is stopped.

In step a3, when the document size is not judged to be the regular size, the sequence advances to step a9, and when the copy button is pressed on, the document conveyance operation is conducted in step a10, and the document size is detected by the second document size detection sensor S2 in step a11. In step a12, it is judged whether the document size is the regular size or not, and when the document size is the regular size, the sequence advances to step a5, and the transfer material corresponding to the document size and the sheet feeding tray accommodating the transfer material are selected and set as described above, and operations from step a6 to step a8 are conducted.

In step a12, when the document size is not the regular size, the transfer material having a larger size in which the document image can be included, or the largest transfer material and sheet feeding tray, loaded in the apparatus, are selected and set in step a13. In step a14, the image formation is conducted, and in step a15, it is judged whether the next document exists or not, and when the next document exists, the image formation is repeated, and when it is detected that there is no document on the tray, the operation is stopped.

As described above, even when the document can not be detected to be the regular size by the first document size detection sensor S1 provided on the document placement tray 200 because the regular sized and the same sized document sheets are irregularly placed, the document size is detected again by the second document size detection sensor S2 and detected to be the regular size, thereby, the image formation is not stopped by the false detection of the document size, and even if the document is irregularly placed, the image formation with high productivity can be performed.

Figure 5:
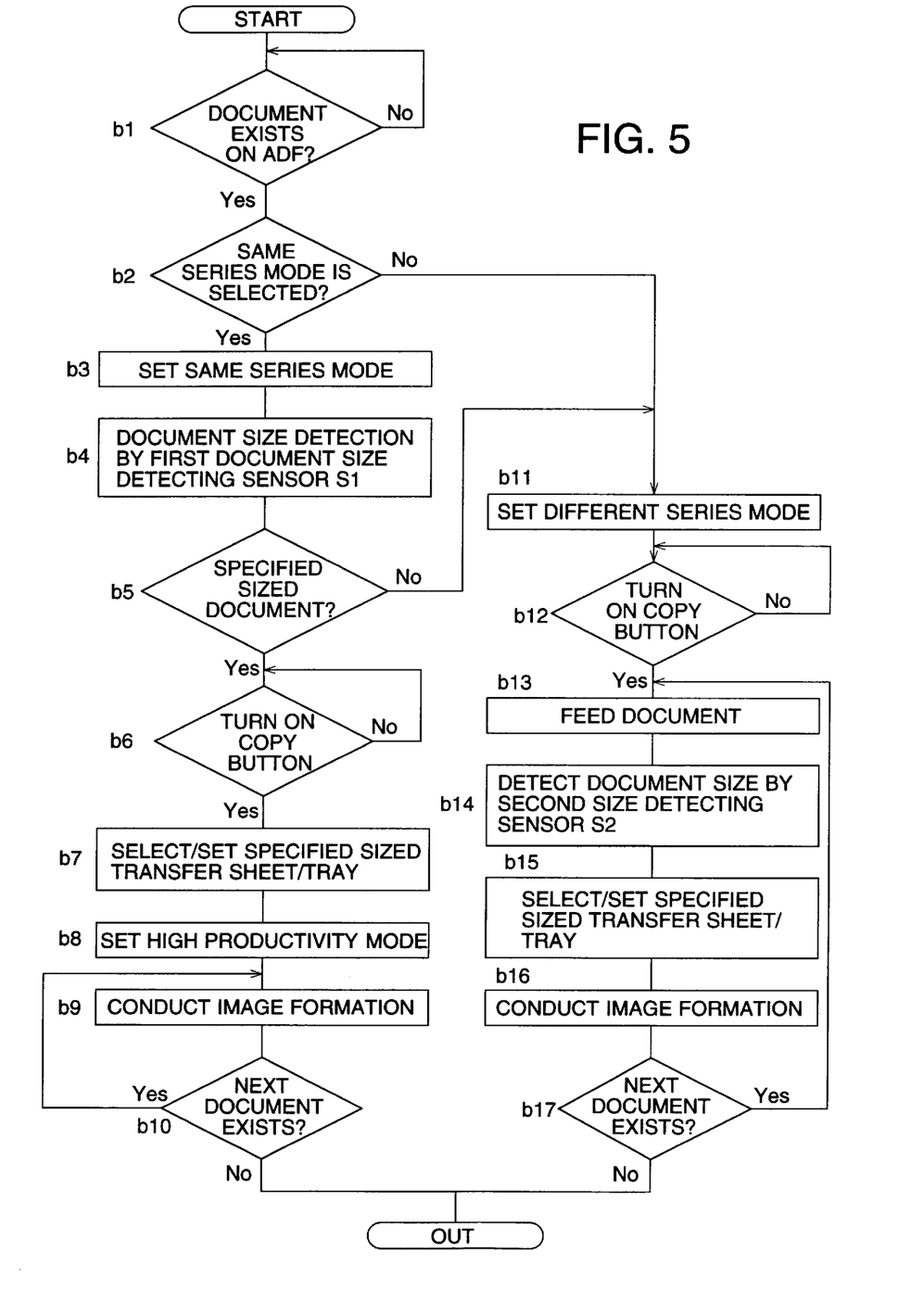
FIG. 5 is a second flow chart showing copying steps by automatic document size detection.

FIG. 5 is the second flow chart, and initially in step b1, when the document is placed on the document placement tray 200, existence of the document is detected by the document detection sensor S0, and the sequence advances to the next step b2. In step b2, the document mode is judged. When the same series document mode is selected, the same series document mode is set in step b3, and the sequence advances to the next step b4.

When the different series mode is selected in step b2, the different series mode is set in step b11, and the different series mode of the step b12 and subsequent steps are conducted.

The document size is detected by the first document size detection sensor S1 in step b4, and it is judged in step b5 whether the document size is the regular size or not. When it is judged that the document size is the regular size, the sequence advances to step b7 when the copy button is pressed on in step b6, and the transfer material corresponding to the document size and the sheet feed tray accommodating the transfer material are selected and set. In step b5, when the document size is not judged to be the regular size, the sequence advances to step b11.

After the operation in step b5, thee sequence may be advances to the copying operation at once. Normally, when the operator selects the same series document mode, because the system is set such that the regular sized document is placed and copied, if the same series document mode is selected and the document is judged to be the regular sized one, because the size of the second and subsequent document sheet is the same as that of the first document sheet, the size of the second and subsequent document sheet is not detected, and it is preferable that the high productivity mode is set in step b8, such that, by using the same sized transfer material as the transfer material selected by the document size information of the first sheet, the subsequent copy operation is conducted, and therefore, the high productivity mode is performed.

Next, in step b9, the image formation is conducted, and it is judged in step b10 whether the next document exists or not, and when the next document exists, the image formation is repeated, and when it is detected that there is no document on the tray, the operation is stopped.

In step b5, when the document size is not judged to be the regular size, the sequence advances to step b11, and the different series mode is set. Next, when it is detected in step b12 that the copy button is on, the document conveyance operation is conducted in step b13, and the document size is detected by the second document size detection sensor S2 in step b14, and the sequence advances to step b15. In step b15, the transfer material and the sheet feeding tray corresponding to the document size are selected and set. Next, image formation is conducted in step b16, and existence of the next document is judged in step b17, and when the image formation is conducted for all the document, operations are stopped.

As described above, although the same series document mode is selected, even when the document can not be detected to be the regular size by the first document size detection sensor S1 provided on the document placement tray because, for example, the regular sized and the same sized document sheets are irregularly placed, the document mode is automatically switched to the different series document mode, and the document size can be detected by the second document size detection sensor S2, thereby, the image formation is not stopped by the false detection of the document size, and when the same series document mode is selected, even if the document is irregularly placed, the image formation can be performed.

Figure 6:
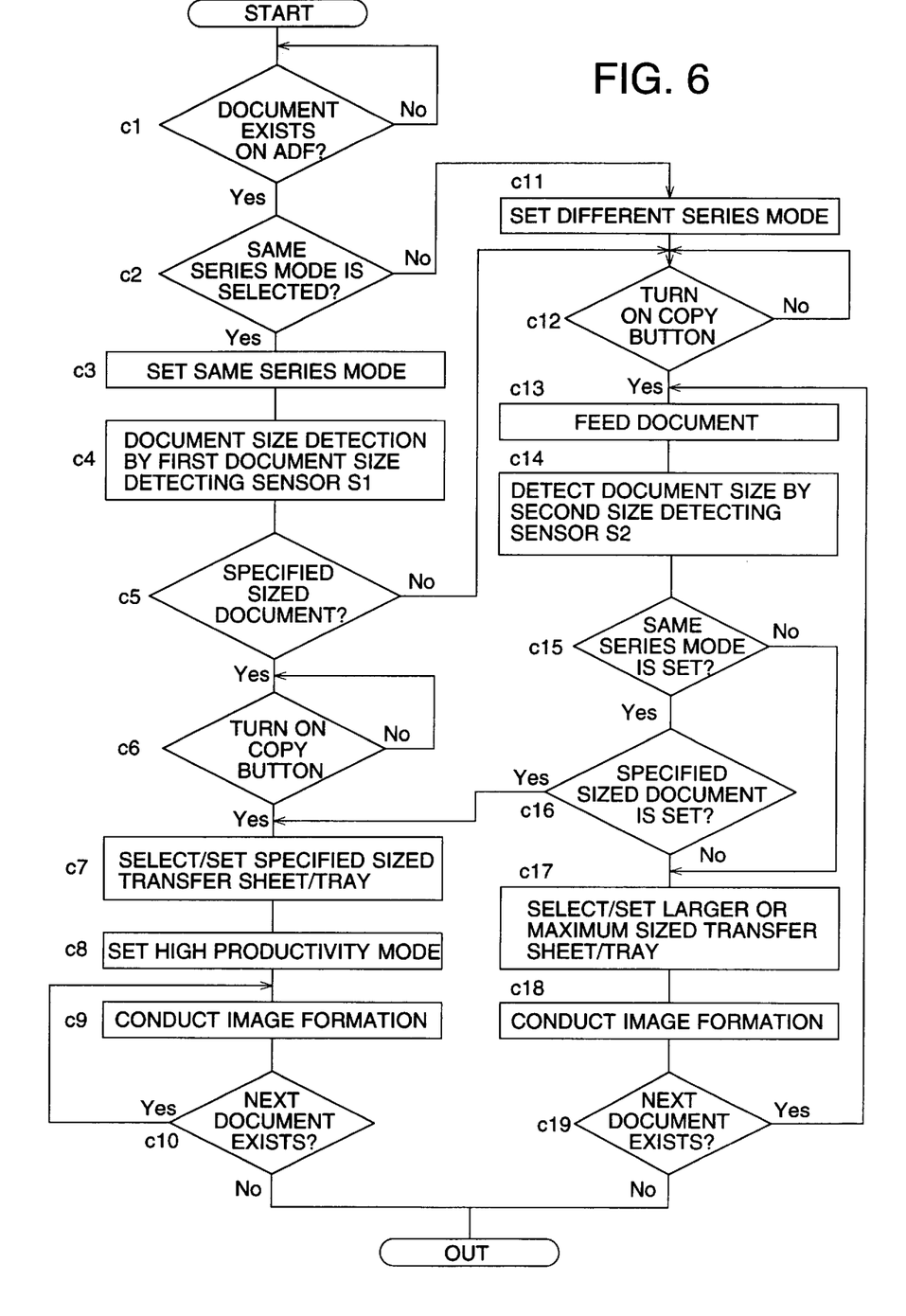
FIG. 6 is a third flow chart showing copying steps by automatic document size detection.

FIG. 6 is the third flow chart, and in the present embodiment, operations from step c1 to step c10 are structured in the same manner as in the embodiment in FIG. 5. When the different series mode is selected in step c2, the different series mode is set in step c11, and the different series mode of step c12 and subsequent steps are conducted. In step c5, when it is judged that the document is not the regular size one, the sequence advances to step c12. In step c12, when it is detected that the copy button is on, the document conveyance operation in step c13 is conducted, and the document size is detected by the second document size detection sensor S2 in step c14, and the sequence advances to step c15. When the same series mode is set, the sequence advances to step c16, and it is judged whether the document is the regular sized one, and when the document is the regular sized one, the sequence advances to step c7, and the above-described steps are carried out in the subsequent sequences. When the document is not the regular sized one, the sequence advances to step c17, and the transfer material having a larger size in which the document image can be included, or the transfer material having a size corresponding to the largest document size loaded in the apparatus, and sheet feeding tray, are selected and set. In the subsequent steps, the image formation is conducted in step c18, and in step c19, it is judged whether the next document exists or not, and when the image formation for all the documents is conducted, the operation is stopped.

In step c15, when the same series mode is not set, the sequence advances to step c17, and after that, operations in step c18 and c19 are conducted, and when the image formation for all the documents is conducted, the sequence is ended.

As described above, even when it can not be detected by the first document size detection sensor S1 provided on the document displacement tray 200 that the document size is the regular sized one, because the document size is detected again by the second document size detection sensor S2, thereby the false detection of the document size is eliminated, and the image formation can be performed, and when the same series document mode is selected, because the document size detection of the second and subsequent document sheets can be neglected, thereby the high productivity copying can be performed.

As described above, in an image forming apparatus of the invention described in Item 1, even when the document can not be detected to be the regular size by the first document size detection means provided on the document placement tray because, for example, the regular sized and the same sized document sheets are irregularly placed, because the document size is detected again by the second document size detection means and detected to be the regular size, thereby, the image formation is not stopped by the false detection of the document size, and even if the document is irregularly placed, the image formation with high productivity can be performed.

In a control method of an image forming apparatus of the invention described in Item 2, even when the document can not be detected to be regular size by the first document size detection means provided on the document placement tray because, for example, the regular sized and the same sized document sheets are irregularly placed, because the document size is detected again by the second document size detection means and detected to be the regular size, thereby, the image formation is not stopped by the false detection of the document size, and even if the document is irregularly placed, the image formation with high productivity can be performed.

In the control method of the image forming apparatus of the invention described in Item 3, although the same series document mode is selected, even when the regular size document can not be detected by the first document size detection means provided on the document placement tray because, for example, the regular sized and the same sized document sheets are irregularly placed, because the document mode is automatically selected to the different series document mode, and the document size can be detected by the second document size detection means, thereby, the image formation is not stopped by the false detection of the document size, and when the same series document mode is selected, even if the document sheets are irregularly placed, the image formation can be performed.

In the control method of the image forming apparatus of the invention described in Item 4, even when the document can not be detected as the regular sized document by the fist document size detection means provided on the document placement tray, the false detection of the document size is eliminated by detecting the document size again by the second document size detection means and thereby, the image formation can be performed, and when the same series document mode is selected, the detection of the second and subsequent documents is neglected, thereby, copy can be performed with high productivity.

What is claimed is:

1. An image forming apparatus comprising:
   (a) a tray on which documents are stacked;
   (b) a first document size detector for detecting a size of the documents stacked on the tray;
   (c) a second document size detector for detecting a size of each of the documents conveyed from the tray;
   (d) an automatic document feeding device having a document reading section for reading an image of each of the documents;
   (e) an image forming section including a transfer material feeder for feeding transfer materials; and
   (f) a controller for selecting and feeding transfer materials according to detected document size,
   wherein when the first document size detector detects that the size of the documents is identical to a regular size, the controller selects and feeds the transfer materials in accordance with the regular size, and when the first document size detector detects that the size of the documents is not identical to the regular size, the controller controls the second document size detector to detect the size of each of the documents conveyed from the tray, and selects and feeds the transfer materials in accordance with the size detected by the second document size detector.

2. The image forming apparatus of claim 1, further comprising a document mode selector provided on an operating section for selecting a same series document mode and a different series document mode,
   wherein when the same series document mode is selected, the controller selects and feeds the transfer materials according to the size detected by the first document size detector, when the different series document mode is selected, the controller controls the second document size detector to detect the size for each document, and selects and feeds the transfer materials in accordance with the size detected by the second document size detector, and when the size detected by the first document size detector is not identical to the regular size, the controller controls the document mode selector to switch over to the different series document mode.

3. The image forming apparatus of claim 1, wherein when the first document size detector detects that the size of the documents is identical to the regular size, the controller selects and feeds the transfer materials in accordance with the regular size, and when the first document size detector detects that the size of the documents is not identical to the regular size, the controller controls the second document size detector to detect the size of a first document which has been stacked on the tray, and when the first document is identical to the regular size, the second document size detector does not detect the size of a second document thereafter stacked on the tray, and then the controller feeds the transfer materials selected according to the size detected for the first document.

4. The image forming apparatus of claim 1, wherein the second document size detector comprises a line sensor for detecting a longitudinal length and a lateral length of each of the documents.

5. A control method for selecting and then feeding transfer materials for use in an image forming apparatus, the control method comprising the steps of:

detecting a size of documents stacked on a tray by a first document size detector;

conveying each of the documents from the tray;

detecting a size of the conveyed documents by a second document size detector;

selecting transfer materials according to the detected document size; and feeding the selected transfer material, wherein when the first document size detector detects that the size of the documents is identical to a regular size, the transfer materials are selected and fed in accordance with the regular size, and when the first document size detector detects that the size of the documents is not identical to the regular size, the second document size detector detects the size, and the transfer materials are selected and fed in accordance with the size detected by the second document size detector.

* * * * *